Figure 1:
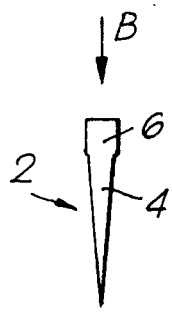

United States Patent [19]

Searle

[11] Patent Number: 5,492,581
[45] Date of Patent: Feb. 20, 1996

[54] FRICTION WELDING

[75] Inventor: John G. Searle, Cannock, England

[73] Assignee: Rolls-Royce plc, London, England

[21] Appl. No.: 242,459

[22] Filed: May 13, 1994

[30] Foreign Application Priority Data

May 13, 1993 [GB] United Kingdom ............... 9309822

[51] Int. Cl.$^6$ ................................................ B23K 37/04
[52] U.S. Cl. .................... 156/73.5; 156/580; 228/2.1; 228/44.3; 228/112.1
[58] Field of Search ................... 156/73.5, 580.2, 156/580; 228/2.1, 112.1, 44.3; 269/57, 900, 909

[56] References Cited

U.S. PATENT DOCUMENTS

| | | | |
|---|---|---|---|
| 3,499,068 | 3/1970 | Brown | 156/73.5 X |
| 3,627,189 | 12/1971 | Ditto et al. | 156/73.1 X |
| 3,699,639 | 10/1972 | Ditto et al. | 228/113 |
| 3,734,383 | 10/1972 | Ritter et al. | 228/2.1 |
| 3,860,468 | 1/1975 | Scherer | 156/73.5 |
| 3,896,986 | 7/1975 | Edwards | 228/2.1 |
| 3,899,378 | 8/1975 | Wragg et al. | 156/73.5 |
| 4,060,190 | 11/1977 | Paolini | 228/2.3 |
| 4,239,575 | 12/1980 | Leatherman | 156/73.5 X |
| 4,605,151 | 8/1986 | Brown | 228/2.3 |
| 5,100,044 | 3/1992 | Searle | 228/112.1 |
| 5,129,571 | 7/1992 | Clark et al. | 228/112.1 |

FOREIGN PATENT DOCUMENTS 1488887 10/1977 United Kingdom.

Primary Examiner—David A. Simmons
Assistant Examiner—J. Sells
Attorney, Agent, or Firm—Oliff & Berridge

[57] ABSTRACT

Holding means for a component in a friction welding operation consists of a hollow cassette which is open at one end. The component is inserted into the cassette through an aperture at the open end that is shaped to frictionally engage a thickened portion of the component with a force greater than forces transmitted to the component during a friction welding operation. The component is pressed into the cassette to a predetermined depth so that a portion of it protrudes and forms the weld interface. Material upset during the welding operation may be sheared by increasing the weld generating force to overcome the frictional holding force so the end face passes over the weld region.

13 Claims, 2 Drawing Sheets

FRICTION WELDING

This invention relates to improvements relating to friction welding.

It has been known for many years that two components, even metal components, can be welded together by reciprocating at least one of the components and urging the components together, the frictional heat generated between the components melting the material of at least one component, and more usually both components, so as to form a friction weld. One example of a technical field in which friction welding is seen as having useful applications is in the field of making compressors or turbines for aircraft engines. Compressor assemblies may comprise a blisk (blades plus integral disc), or a blum (blades plus integral drum) which is effectively several blisks joined together.

Holding a blade, or other component, to be friction welded poses problems.

It is an aim of this invention to provide a new way of holding a component to be friction welded.

According to one aspect of the invention there is provided a method of holding a component in a friction welding operation where a first component is urged against a second component, relative friction-generating cyclical motion is produced between the two components to generate welding heat, and a weld-pressure generating force is applied to the components wherein at least one of said components is held using only a frictional holding force.

Preferably the frictional forces act in the generally opposite direction to the weld-pressure generating direction.

The frictional gripping force on the component by component holding means is at least as great as the weld-pressure generating force.

According to a further aspect of the invention there is provided a method of friction welding comprising holding a component to be welded to a workpiece using frictional clamping forces as claimed in any preceding claim, generating a frictional relative movement resisting force between the friction clamping means and the component, generating a weld pressure between the component and the workpiece, and arranging for relative friction-generating movement between the component and the workpiece so as to generate heat for welding.

Preferably the method also includes removing weld flash which may be generated between the component and the workpiece by causing the friction clamping means and the workpiece (or weld flash) to move relatively towards each other, so that the friction clamping means moves in use relative to the component in a weld-flash removal operation following a welding operation and removes the weld-flash as it passes the weld.

According to another aspect of the invention there is provided friction clamping means friction clamping means for holding a component during a friction welding operation using frictional forces comprises holding means having an aperture into which the component is received, said aperture having sides which engage opposite sides of the component with frictional holding forces.

The clamping force of the friction clamping means is preferably not reduced substantially when the friction clamping means is pulled off the component.

Preferably the friction clamping means and the workpiece are moved apart along a line parallel to the weld pressure direction after flash removal.

Preferably the component is a press fit in the friction clamping means and the tightness of fit generates the frictional relative movement resisting force.

The above inventions are especially, but not exclusively, suited to welding blades onto a compressor disc or drums, or blades to turbines.

Figure 2:
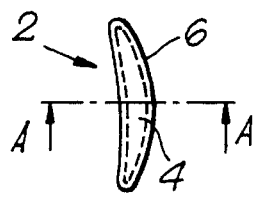
Figure 3:
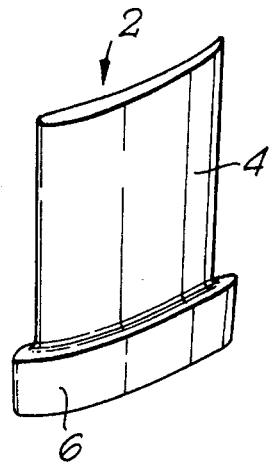
Figure 4:
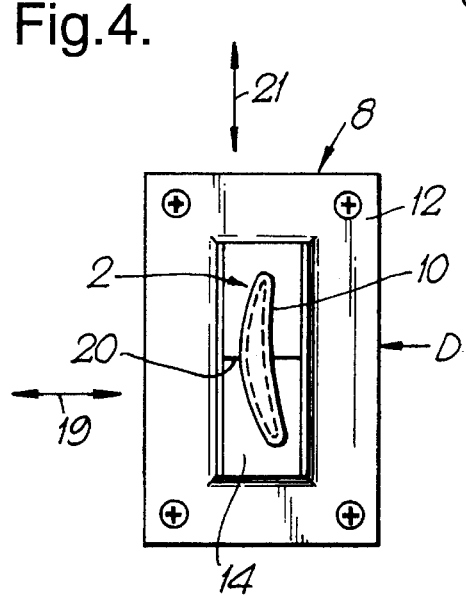
Figure 5:
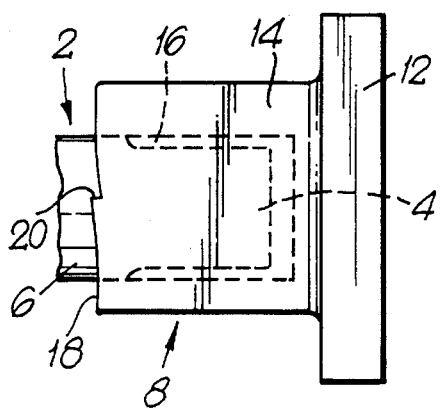
Figure 6:
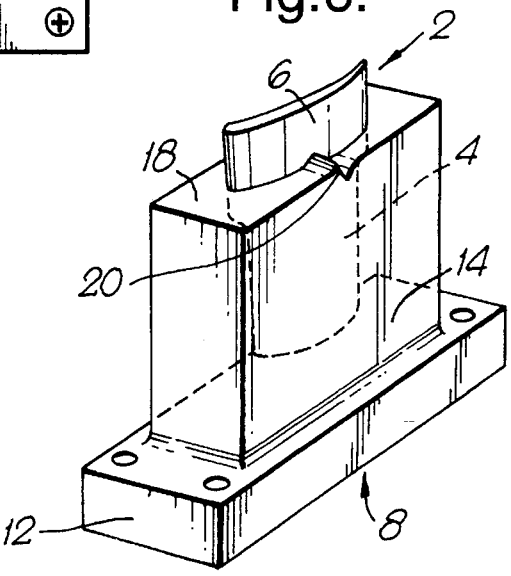

An embodiment of the invention will now be described by way of example only with reference to the accompanying drawings of which:

FIG. 1 shows a blade with root shank adapted to friction welding on section AA of FIG. 2, FIG. 2 shows the blade of FIG. 1 viewed in the direction of arrow B, FIG. 3 shows a perspective view of the blade of FIGS. 1 and 2, FIG. 4 shows an end view of a holding cassette loaded with the blade of FIGS. 1 to 3, FIG. 5 shows a side view of the cassette and blade viewed in the direction of arrow D in FIG. 4, FIG. 6 shows a perspective view of the cassette of FIGS. 4 and 5, and FIGS. 7 to 11 illustrate schematically stages in the welding of the blade of FIGS. 1 to 3 to a disc periphery using the cassette of FIGS. 4 to 6.

Referring to FIGS. 1 and 3 of the drawings, an airfoil blade blank is shown at 2. FIG. 1 is a section through the blade blank on the line AA of FIG. 2, and FIG. 2 is an end view of the blank in the direction of arrow B in FIG. 1, and FIG. 3 is a perspective view.

FIG. 2 shows clearly the aerofoil section 4 of the blade, and the slightly thicker cross-section of the root portion 6. Preferably for reasons which will become apparent below the sides of the root portion 6 are parallel. The root of the blade is machined to the desired finished shape, preferably by broaching, after it has been welded to a disc or drum. The root portion 6 of the unwelded blade 2 which is welded to the drum may comprise in cross-section a rectangular shank 6.

FIG. 4 is an end view of a component loaded into a blade holder, generally indicated at 8, corresponding to the view of FIG. 2 of the blade alone. FIG. 5 is a view in the direction of arrow D in FIG. 4 and shows details of a blade 2 held in the component holder 8.

Referring now to FIGS. 4 to 6 the component holder 8 comprises essentially a hollow box, tube or cassette open at one end. At the open end the sides of the holder define an aperture 10 into which the blade 2 is pressed. The shape and dimensions of aperture 10 correspond to the plan shape and dimensions of root shank 6 such that a substantial force is necessary to press the blade into the component holder 8. Further reference will be made to this operation below with reference to FIG. 7. The side walls surrounding the aperture 10 are preferably parallel and engage the flanks of the component with a substantial frictional force. The flanks of the component are also parallel. Normally, it is expected, the component will be formed with a thicker root portion to accommodate the parallel blade root flanks.

The blade shank 6 must be a force-fit in the aperture 10 so that a substantial force has to be exerted, in excess of the forces generated during the friction welding operation, in order to insert the blade root 6 into the component holder 8 and to ensure it is held in place by friction throughout the welding operation. The frictional force by which the blade is held in place in the holder must provide a residual holding force even when other forces acting on the holder/blade interface reach their maximum values during the welding phase.

The component holder or cassette 8 comprises a rectangular base portion 12 from one face of which there is an upstanding sleeve, tube or box portion 14 into the hollow interior 16 of which the blade blank 2 is received. The internal cavity 16 of the cassette 8, as shown by a dashed line in FIG. 5 is blind and, therefore, does not extend through base portion 12. This is not absolutely necessary, however, and the cavity 16 may extend through base 12 so that the cassette is open at both ends (this may ease manufacture of the cassette). The internal surfaces of the cassette, which define internal cavity 16, may be spaced apart away from the aperture 10 as is shown in FIGS. 7 to 11. In this latter case the side walls of aperture 10 which engage the blade shank extend parallel from the cassette end face into the interior for a depth sufficient to generate the desired frictional clamping force.

The end face 18 of the cassette 8 may be formed flat or, as shown in FIGS. 4 to 6, it may be formed with a raised shearing edge 20 extending laterally across the end face on either side of aperture 10. Thus, when a blade is loaded into the holder 8 with a portion of the root shank 6 protruding above end face 18 the raised edge 20 extends away from either side of the blade.

The clamping means of the present invention is useful in, but not exclusive to, the angular reciprocatory welding method and apparatus described in co-pending patent application nos. GB 9309824.2 and GB 9309865.5 (Agents Ref:AST 1265 & AST 1266). Relative angular friction movement between the drum and the blade may be in the direction of arrow 19 or arrow 21, or indeed any direction in the interface plane.

The component holder 8 has an internal chamber which is adapted to receive in use a component to be welded to a workpiece. Thus the component extends in use almost wholly into the chamber. The holder 8 surrounds the blade 2 which is expected to be close to near finished shape and therefore should be shielded against direct forces such as end loads during welding. In this arrangement, as described above, all loads are applied through the faces of the aperture 10 to the shank 6 of the blade. Thus, the airfoil portion 4 of the blade is free of external forces during welding. All welding forces are exerted on the blade shank 6 through the side walls of the aperture 10 which engage the sides of the root shank. The portion of the root which will form the weld joint extends beyond the end face 18 of the component holder 8.

According to the method of holding the component during a welding operation the first component is urged against another component with a weld-pressure generating force while relative friction generating cyclical motion occurs between the two components to generate welding heat, and the component is held using frictional forces only. Preferably it is arranged that the frictional holding forces act generally in the opposite direction to the weld-pressure generating force. The frictional holding or gripping force exerted on the component by the component holder is at least as great as the weld-pressure generating force so that there is always a residual gripping force acting on the blade shank. The tightness of fit generates the frictional holding force which resists relative movement of the holder and held component.

When the weld zones have been heated and softened by frictional heating the weld generating force is increased to maximum a quantity of material form the weld zone is inevitably upset. This is generally considered beneficial since the expelled material is from the interface surfaces and contains impurities, such as oxides, which tend to reduce weld strength.

A welding operation will now be described in more detail with reference to FIGS. 7 to 11.

Figure 7:
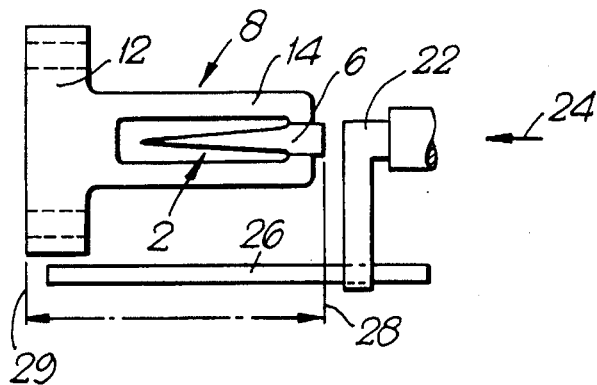

The first stage of the operation, FIG. 7, comprises loading a blade blank 2 (component) into a holder or cassette 8. This is carried out using an hydraulic press tool 22 in the direction of arrow 24. The press tool 22 is fitted with a depth gauge 26 set to a predetermined distance 28. The blade 2 is then pressed into the aperture 10 in holder 8 until the tip of gauge 26 reaches a datum surface 29 flush with the bottom face of the base portion 12 of the holder. Thus, the overall height of the component holder 8 and the portion of the blade root 6 protruding above end face 18 is always equal to the predetermined distance 28.

Figure 8:
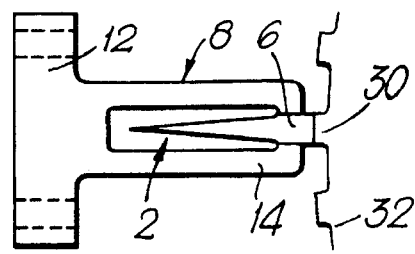

The loaded cassette is subsequently positioned in a friction welding machine and presented to a stub 30 on the periphery of a disc 32 ready for a welding operation, FIG. 8. In the particular example being described the welding machine angularly reciprocates disc 30 while a weld-generating force arrow E is applied to component holder 8, as described in co-pending application nos. GB 9309824.2 and GB 9309865.5 (Agents Ref: AST 1265A and AST 1266A).

Figure 9:
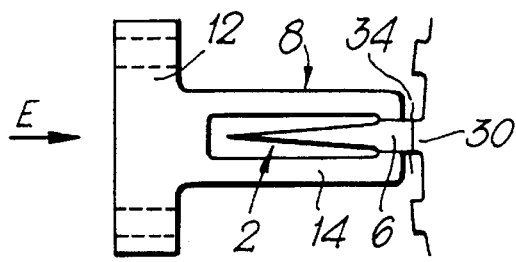

As the welding operation proceeds, as shown in FIG. 9, the interface region of root 6 and stub 30 are heated by friction rubbing and an upset 34 is expelled from the sides of the Joint. The weld force E is maintained throughout the rubbing phase and when the two components are brought to rest whereupon the joint is formed.

After a relatively short period of time to allow the weld joint to "set", during which the weld force E is maintained, the weld force E exerted on the holder 8 is then increased. It will be appreciated from the description above that force E while being sufficient to generate the weld joint does not overcome the frictional forces holding blade 2 in the jaws of the component holder 8. Thus, the component holder 8 does not move relative to the blade 2.

Figure 10:
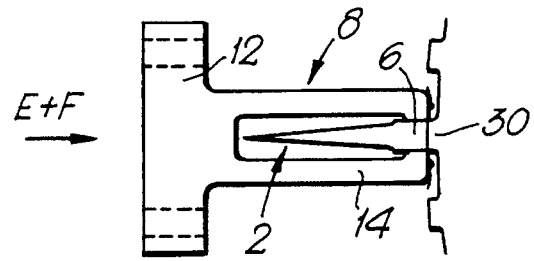

When the force on component holder 8 is increased, as shown in FIG. 10, by an amount F which is sufficient to overcome the frictional holding force the holder moves forward relative to the blade 2 towards the periphery of the disc 30. Sufficient movement is permitted to take end face 18 past the weld interface during which movement the feature 20 carried on the end face begins a shearing or clipping action on the weld upset 34. As a result the weld upset is removed in a single, integral operation with the weld generation.

Figure 11:
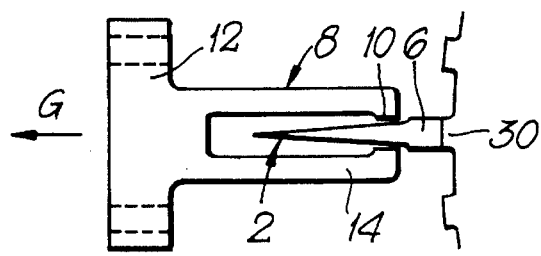

Finally, the end force on the holder 8 is reversed, FIG. 11, and a withdrawal force G is exerted sufficient to withdraw the holder from the blade root shank. The disc 32 is then free to be indexed around to present a fresh stub 30 opposite the welding station when a further blade may be welded in place in a repeated operational sequence.

The frictional relative movement resisting force between the clamping means and the component is preferably not reduced, or not reduced substantially, in the flash removal operation. In the described example the whole of the frictional gripping force is generated by the construction and resilience of the holding means.

Very soon after the bonding operation, within a few seconds, weld strength is achieved and the holding means may be pulled-off the blade shank. The clamping force of the friction clamping means is preferably not reduced substantially when the friction clamping means is pulled off the component.

Preferably the friction clamping means and the workpiece are moved apart along a line parallel to the weld pressure direction after flash removal.

The present invention is especially, but not exclusively, suited to welding blades onto a compressor disc or drums, or blades to turbines. That is, the component loaded into the cassette holder need not be a blade nor the component to which it is welded need to be a disc. In the case of blisks and blums, however, the invention may be used in original manufacture or repair.

We claim:

1. A method of holding a component in a friction welding operation in which a first component is urged against a second component by a weld-pressure generating force, and relative friction-generating cyclical motion is produced between the two components to generate welding heat, said method comprising the steps of:

engaging the first component with friction clamping means by pressing the first component with a substantial force into a component receiving aperture defined by parallel internal side walls, thereby generating a frictional holding force at least as great as the weld-pressure generating force applied to the first component during the friction welding operation; and holding the first component during the friction welding operation with the friction clamping means solely by frictional engagement between the internal side walls of the component receiving aperture and opposite sides of the first component.

2. A method as claimed in claim 1 wherein the frictional holding force acts in a direction generally opposite to the direction of the weld-pressure generating force.

3. A method as claimed in claim 2 wherein the clamping force of the friction clamping means is not reduced substantially when the friction clamping means is removed from the first component.

4. A method of friction welding comprising the steps of:

engaging at least a first component with friction clamping means by pressing the first component with a substantial force into a first component receiving aperture defined by parallel internal side walls, thereby generating a frictional holding force at least as great as a weld-pressure generating force applied to the first component during a welding operation;

holding the first component during the friction welding operation with the friction clamping means solely by frictional engagement between the internal side walls of the first component receiving aperture and opposite sides of the first component;

urging the first component against a second component by exerting the weld-pressure generating force; and causing relative friction-generating cyclical motion between the first component and the second component to generate welding heat.

5. A method as claimed in claim 4 wherein the frictional holding force acts in a direction generally opposite to the direction of the weld-pressure generating force.

6. A method as claimed in claim 4 wherein the clamping force of the friction clamping means is not reduced substantially when the friction clamping means is removed from the first component.

7. A method as claimed in claim 4 further comprising the step of removing weld flash between the component and the workpiece by causing the friction clamping means and the workpiece to move relatively towards each other, so that the friction clamping means moves in use relative to the component in a weld-flash removal operation following a welding operation and removes the weld-flash as it passes the weld.

8. A method as claimed in claim 7 wherein the friction clamping means is moved forwards in the direction of weld pressure to remove the weld-flash.

9. A method as claimed in claim 8 wherein during a step to remove weld-flash the frictional relative movement resisting force between the clamping means and the first component is not reduced substantially.

10. A method as claimed in claim 8 wherein after a step to remove weld-flash the friction clamping means and the second component are moved apart along a line parallel to the weld pressure direction.

11. Friction clamping means for holding a component during a friction welding operation comprising a component holder having engaging means for engaging the component solely by a frictional holding force at least as great as a weld-pressure generating force, the engaging means including a base portion formed with parallel internal side walls that define a component receiving aperture into which the component must be pressed with a substantial force, whereby the component is held solely by the frictional holding force between the internal side walls of the component receiving aperture and opposite sides of the component.

12. Friction clamping means as claimed in claim 11 wherein the frictional holding force acts in a direction generally opposite to the direction of the weld-pressure generating force.

13. Friction clamping means as claimed in claim 11 wherein the friction clamping means is provided with a feature to facilitate flash-weld removal, the feature being formed as one-piece with the clamping means.

* * * * *